United States Patent [19]

Unno et al.

[11] Patent Number: 4,569,115
[45] Date of Patent: Feb. 11, 1986

[54] METHOD AND APPARATUS FOR CONTROLLING THE DEPTH OF CUT IN THE RADIAL DIRECTION OF A ROTARY CUTTING TOOL IN A MACHINE TOOL

[75] Inventors: Keizo Unno; Tamotsu Yamamoto, both of Tokyo; Hitoshi Shimizu, Kawasaki, all of Japan

[73] Assignee: Ikegai Tekko Kabushiki Kaisha, Tokyo, Japan

[21] Appl. No.: 529,480

[22] Filed: Sep. 6, 1983

[51] Int. Cl.⁴ .................... B23B 3/26; B23Q 3/157
[52] U.S. Cl. ................................. 29/558; 29/568;
  82/1.4; 82/2 E; 408/150; 409/233
[58] Field of Search ............... 29/26 A, 568; 409/80,
  409/233; 408/1 R, 3, 150; 82/1.4, 1.5, 2 A, 2 B,
  2 E; 279/6

[56] References Cited

U.S. PATENT DOCUMENTS

| | | | |
|---|---|---|---|
| 3,121,350 | 2/1964 | Warsewa et al. | 82/1.4 X |
| 3,613,192 | 10/1971 | Tanabe et al. | |
| 4,250,775 | 2/1981 | Jerue et al. | 82/2 B X |
| 4,354,305 | 10/1982 | Plummer et al. | 29/568 |
| 4,411,177 | 10/1983 | Batistoni | 82/2 E |
| 4,432,258 | 2/1984 | Currer | 82/1.4 X |

*Primary Examiner*—Z. R. Bilinsky
*Attorney, Agent, or Firm*—Tilton, Fallon Lungmus & Chestnut

[57] ABSTRACT

A method and an apparatus for controlling a radial depth of cut of a rotary cutting tool in a machine tool, in particular in a machining center is disclosed wherein an eccentric mechanism for controlling the radial depth of cut of the tip of the cutting tool is not contained in a main shaft as in a conventional machine tool. Instead, it is provided outside the main shaft, and the radial depth of cut of the tip of the cutter is controlled by a tool holder to be automatically changeably fit to the forward end of the main shaft such that a tool holding shaft mounted to the tool holder by means of an eccentric mechanism so as to have the eccentricity relative thereto be adjustable is adapted to be controlled through a depth of cut central shaft passed through the bore of a draw-bar, concentrically disposed within the bore of the main shaft, by means of a servo-motor through a differential gear mechanism and the eccentric mechanism.

3 Claims, 7 Drawing Figures

FUNDAMENTAL AXIS FOR MEASURING ECCENTRICITY (e) AND ANGULAR POSITION ($\theta$)

AMOUNT OF ECCENTRICITY (e)

METHOD AND APPARATUS FOR CONTROLLING THE DEPTH OF CUT IN THE RADIAL DIRECTION OF A ROTARY CUTTING TOOL IN A MACHINE TOOL

BACKGROUND OF THE INVENTION

The present invention relates to a machine tool and more particularly to a method for controlling the depth of cut in the radial direction of a rotary cutting tool in a numerically controlled machine tool such as a machining center and an apparatus for carrying out the same.

Hitherto, in a numerically controlled machine tool such as a machining center, when the depth of cut in the radial direction (hereinafter referred to as the "radial depth of cut") of the tip of the cutting tool is to be controlled, it has been a common practice for an eccentric mechanism to be contained within the bore of the main spindle, and the control is carried out by radially shifting the tip of the tool by means of the eccentric mechanism. However, with such a system, since an eccentric bore having a large diameter must be formed substantially over the whole length of the main spindle, not only is its machining difficult, but also the rigidity of the main spindle is decreased. In order to maintain rigidity, the outer diameter of the main spindle must be increased.

Furthermore, since it is impossible for the amount of eccentricity to be made large, there is the problem that the radial depth of cut of the rotary cutting tool is inevitably limited.

SUMMARY OF THE INVENTION

It is a principal object of the present invention to provide a method for controlling the radial depth of cut of a rotary cutting tool in a numerically control machine tool such as a machining center as well as an apparatus for carrying out the method, the machine tool being provided with a rotary main spindle that is adapted to interchangeably fit a tool holder at its forward end and carrying out machining by the relative movement between the rotary cutting tool held by the tool holder and a workpiece, wherein an eccentric mechanism to control the radial depth of cut of the cutting tool is not contained in the main spindle, the machining is made easy, there is no decrease in the rigidity of the main spindle, the increase in the outer diameter of the main spindle is suppressed, and a larger radial depth of cut of the rotary cutting tool is possible than when the eccentric mechanism is contained in the main shaft as in a conventional machine tool.

In accordance with the present invention a method and an apparatus for controlling the radial depth of cut of a rotary cutting tool in a machine tool are provided, in particular for a machining center which is provided with a rotary main spindle adapted to interchangeably fit a tool holder and which carries out the machining by the relative movement between the cutting tool and a workpiece. In the present invention, the tool holder is adapted to hold the cutting tool such that when the tool holder is disengaged from the main spindle, the radial depth of cut of the tip of the cutting tool can be adjusted by revolving an eccentric mechanism which has been locked at the fundamental angular position of the tool holder. The tool holder is adapted to be engaged with the forward end of the main spindle which has been stopped at a predetermined angular position, simultaneously the lock of the eccentric mechanism is released, the tool holder fit to the main spindle is fastened by a fastening mechanism mounted within the bore of the main shaft, a depth of cut control shaft axially moveably arranged within the bore of the fastening mechanism is adapted to be rotated by a servo-motor through a differential mechanism in synchronization with the main spindle, the depth of cut control shaft is adapted to engages with the eccentric mechanism at the fundamental angular position of the tool holder, and the servemotor is adapted to control the radial direction of the tip of the cutting tool from the fundamental angular position by a numerical control value of the rotational angle through the depth of cut control shaft and the eccentric mechanism.

BRIEF DESCRIPTION OF THE DRAWINGS

The above brief description as well as further objects, features, and advantages of the present invention will be more fully understood by reference to the following detailed description of the presently preferred but nonetheless illustrative embodiment in accordance with the present invention, when considered in conjunction with the accompanying drawings, wherein:

FIGS. 2a and 2b are longitudinal sectional elevational views of one embodiment of the present invention, illustrating the constitution of the headstock of a machining center in the state of fastening a tool holder at the forward end of the main spindle, in which FIGS. 2a and 2b represent substantially the rear half and front half of the headstock, respectively;

FIG. 3 is an end view of the embodiment shown in FIGS. 2a and 2b as viewed from the right side of FIG. 2a;

DESCRIPTION OF THE PREFERRED EMBODIMENT

Prior to entering the description of the preferred embodiment, the principles behind the control of the radial depth cut of a rotary bit or cutting tool in a machine tool by the provision of an eccentric mechanism in a tool holder in accordance with the present invention will be explained with reference to all of the attached drawings, but with particular reference to FIG. 1.

Figure 1:
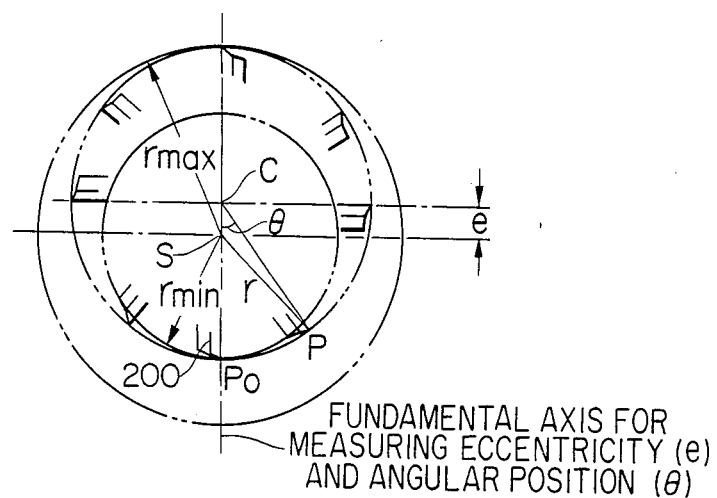
FIG. 1 is a diagram illustrating the principle of the radial depth of cut control method in accordance with the present invention.
Figure 4:
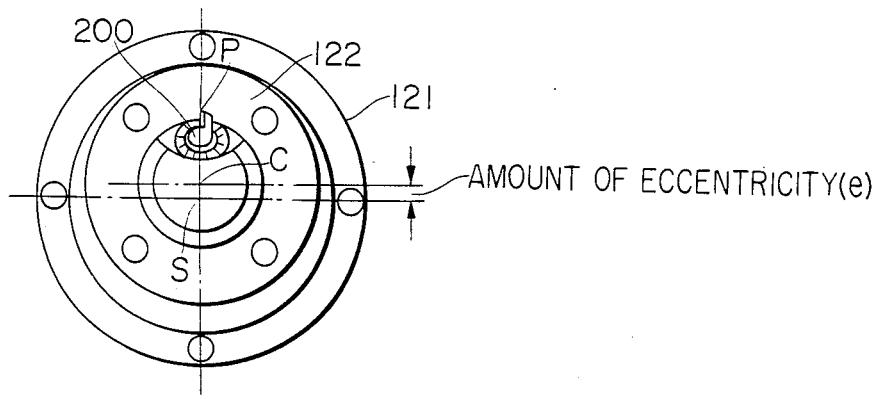
FIG. 4 is a similar end view as viewed from the left side of FIG. 2b.

FIG. 1 is a front elevational view of a tool holder exchangeably mounted to the front end of a main spindle of a machine tool wherein the reference character S is the center of the main spindle, C is the center of a tool holding shaft of a tool holder, eccentric with respect to the center S, on which a rotary bit (200) is mounted, e is the amount of eccentricity of center C from center S, the reference numeral (200) is the rotary bit mounted on the tool holding shaft of the tool holder, $\theta$ is the rotational angle of the tip of bit (200) from the fundamental rotational position, $P_0$ is the position of the top of the rotary bit (200) at the rotational fundamental angular position (i.e. the position when $\theta = 0$), and P is the position of the tip of the rotary bit (200) when the rotational angle of the tool holding shaft about center C is $\theta$. Other various values are defined as follows:

$\overline{CP}$: the distance from the center C of the tool holding shaft to position P of the tip of the bit (200) (determined by the position of the tip of the rotary bit);

$\overline{SP}$: the distance from the center S of the main spindle to position P of the tip of the bit (determining the radius of the bore to be formed in a workpiece by the tip of the bit);

$\overline{SC}$: the amount of eccentricity, e (determined by the position of the center C relative to the center S);

From the above data, the following equation can be formulated:

$$\overline{SP} = \sqrt{\overline{CP}^2 + \overline{SC}^2 - 2 \cdot \overline{CP} \cdot \overline{SC} \cdot \cos\theta}$$

Since $\overline{CP}$ and $\overline{SC}$ are constant, by controlling the rotational angle $\theta$ of the tool holding shaft through the rotation of an eccentrically positioned tool holding shaft (112) by means of a servo-motor (40), the cutting rotational radius $r = \overline{SP}$ of the tip of the rotary bit which corresponds to the bore of the workpiece to be opened by the bit can be controlled as desired between a minimum radius, r min, and a maximum radius, r max. In this case, r min is the minimum boring radius of the tip P of the bit which the eccentrically positioned tool holding shaft (112) generates at the fundamental angular position $P_0$, i.e. when $\theta = 0$, while r max is the maximum boring radius of the tip P of the bit which occurs at $\theta = 180°$. The difference r max $-$ r min $= 2e$ is the maximum depth of cut. Therefore, by suitably setting the reduction ratio between the servo-motor (40) and the eccentric tool holding shaft (112), it is possible to control the rotational angle of the tool holding shaft. For example, it is possible to control the rotational angle so as to obtain a rotation of 0.001° pulse between $\theta = 0$ and $\theta = 180°$. Therefore, it will be apparent that the depth of cut of the tip P of the rotary bit can be controlled so as to vary from zero to a maximum of 2e.

Now, one embodiment of the present invention which is constituted so as to operate on the basis of the above-described principles will be fully explained.

The present invention which is embodied in a numerically controlled machine tool and shown in FIGS. 2 to 6 principally comprises three units: (A) a headstock, (B) a depth of cut controlling gear box, and (C) a radial direction controlling rotary tool holder.

The functions of the respective units are summarized below.

(A) Headstock

This unit is a driving mechanism for a main spindle to give cutting force to the rotary bit or cutting tool, and comprises an electric motor to be mounted on the body of the headstock, gear trains to change the speed of the main spindle, and a main spindle to which fastens a tool holder for controlling the radial depth of cut.

(B) Depth of Cut Controlling Gear Box

This unit comprises a differential gear mechanism adapted to effect synchronized rotation of the main spindle and a radial depth of cut controlling shaft as well as to cause relative rotation between the main spindle and the radial depth of cut controlling shaft by superimposing on the synchronized rotation the rotation of a servo-motor, and a connecting mechanism to transmit the relative rotation to the radial depth of cut controlling tool holder.

(C) Radial Direction Controlling Rotary Tool Holder

This unit comprises a mechanism to decrease the relative rotation between the main spindle and the depth of cut controlling shaft and to convert the relative rotation to a radial depth of cut of the tip of the rotary bit by the use of an eccentric mechanism, and a lock mechanism adapted to automatically lock and unlock the tool holding shaft at the time of clamping to or unclamping from the main spindle of the tool holder.

Next, separate explanations will be given of the following mechanisms which consist of the combination of the above described units: (I) a rotation transmission mechanism, (II) an interlocking mechanism, and (III) a mechanism for controlling radial depth of cut.

Figure 2A:
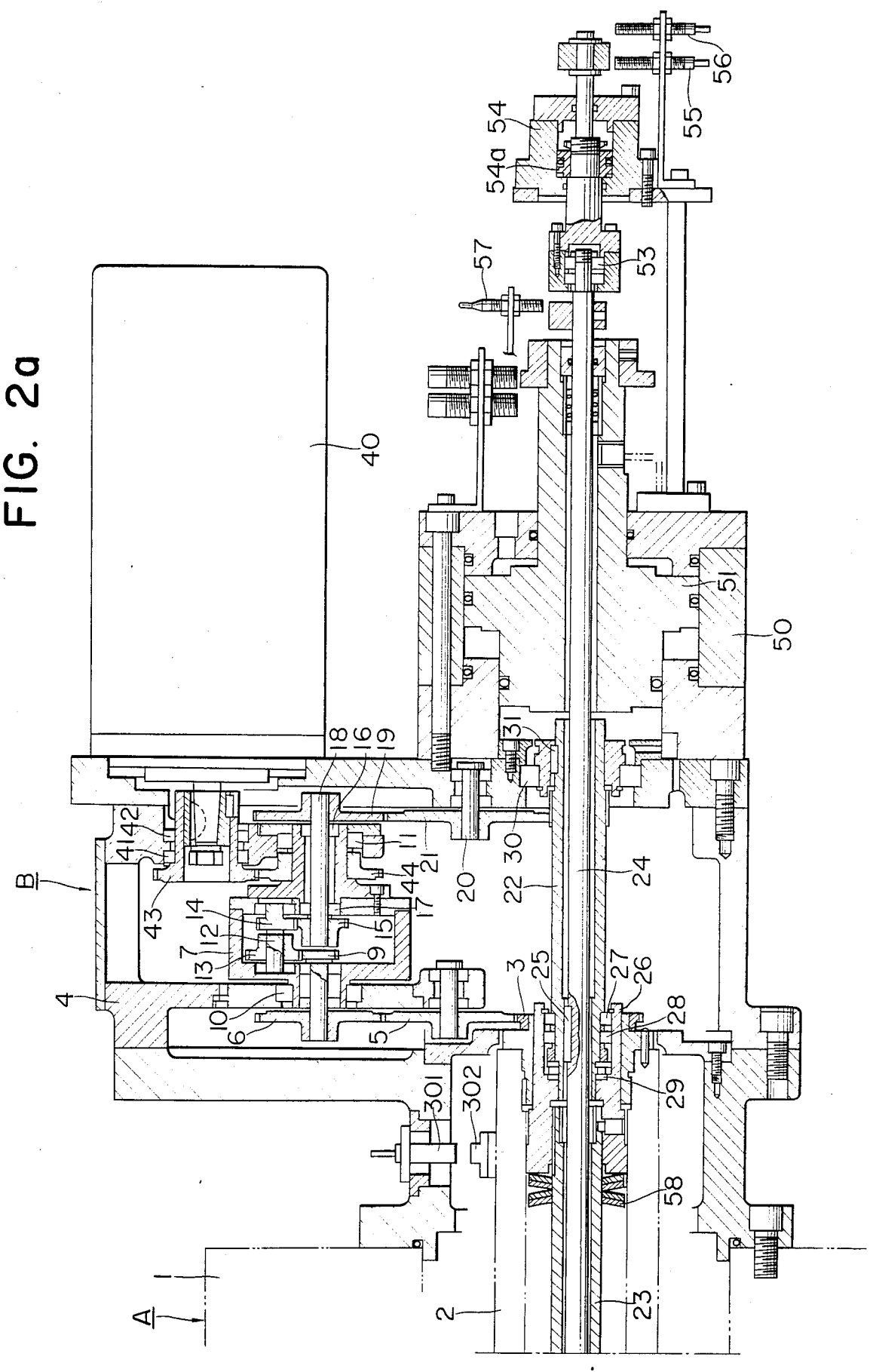

(I) Rotation Transmission Mechanism (FIG. 2a)

A main spindle 2 which is rotatably supported within the body 1 of a headstock A and adapted to be rotatably driven by a drive mechanism (not shown) has on its rear end portion a gear 3 secured which transmits rotation of main spindle 2 to a gear 6 through an idle gear 5 that is freely rotatably supported by the body 4 of a gear box B for controlling depth of cut. Gear 6 is fixedly secured to a shaft 8 which is rotatably supported within a differential gear box 7 so that the rotation of gear 6 is transmitted to a gear 9, also fixedly secured to shaft 8, within gear box 7. The body 4 of the depth of cut controlling gear box B is secured to the body 1 of the headstock A, and the differential gear box 7 is rotatably supported by the body 4 of the depth of cut controlling gear box B by bearing 10 and 11. Gear 9 meshes with a gear 13 secured on a shaft 12 which is rotatably supported within differential gear box 7, and a gear 14 secured to shaft 12 meshes with a gear 15 which is secured to a shaft 18 which is in turn rotatably mounted on differential gear box 7 by bearings 16 and 17, bearings 16, 17 being coaxial with the center axis of differential gear box 7. The rotation of gear 14 is transmitted through shaft 18 to a gear 19 which is secured to shaft 18 outside the differential gear box 7. The rotation of gear 19 is transmitted to gear 22 through an idle gear 21 which is secured to a shaft 20 which is in turn rotatably supported by the body 4 of the depth of cut controlling gear box B.

Gear 22 is supported on a depth of cut controlling shaft 24 so as to be axially slidably thereon, but is prevented from rotation relative thereto by means of a sliding key 25. The depth of cut controlling shaft 24 passes through a bore formed in a draw-bar 23 which is loosely axially mounted within the bore formed within main spindle 2. Gear 22 is rotatably supported by bearings 27, 28, and 29 to a nut-piece 26 which is fixedly secured to draw-bar 23. In addition, gear 22 is rotatably mounted on the body 4 of the depth of cut controlling gear box B by a bearing 30 and at the same time supported so as to be axially slidably by means of a key 31.

A gear 43 which is connected through a key to the output shaft of a depth of cut controlling servo-motor 40 for the tip of the bit, mounted on the body 4 of depth of cut controlling gear box B, and also rotatably supported by the body 4 of the depth of cut controlling gear box B by bearings 41, 42 meshes with a gear 44 secured to differential gear box 7, whereby the rotation of the servo-motor 40 is adapted to rotate differential gear box 7 through gears 43 and 44.

At this point it should be mentioned that the numbers of teeth of gears 3, 6, 9, 13, 14, 15, 19 and 22 are to be appropriately selected such that a rotational speed ratio of 1:1 is obtained between the main spindle 2 and the depth of cut controlling shaft 24. That is, when the servo-motor 40 is not operated, the main spindle 2 and the depth of cut controlling shaft 24 synchronously rotate, but when the servo-motor 40 comes into operation its rotation is transmitted to gear 44 through gear 43, causing the differential gear box 7 to be rotated. In this case, a planetary gear mechanism revolves shaft 12 around gear 9 so that the rotational angle of differential gear box 7 is superimposed on the rotational angle of shaft 8, i.e. the angle of revolution of shaft 12 is superimposed on a rotational angle determined by gears 9, 13, 14, and 15 and the superimposed angle of revolution is given to shaft 18, and the output of shaft 18 is transmitted to gear 22 through gears 19 and 21. Thus, there is interposed a differential gear mechanism between main spindle 2 and the depth of cut controlling shaft 24, and a rotational angle which is controlled by the depth of cut servo-motor 40 is adapted to cause a desired relative rotation at a desired relative speed between main spindle 2 and the depth of cut controlling shaft 24.

(II) Interlocking Mechanism (FIG. 2a)

The depth of cut controlling shaft 24 which loosely passes through the bore of draw-bar 23 so as to be rotatable and axially shiftable therein also passes through the through hole of the piston 51 of a cylinder 50 for clamping a bit and is rotatively supported by bearings 53 at its rear end portion, the bearings 53 being suitably supported by the body 1 of headstock A.

Figure 2B:
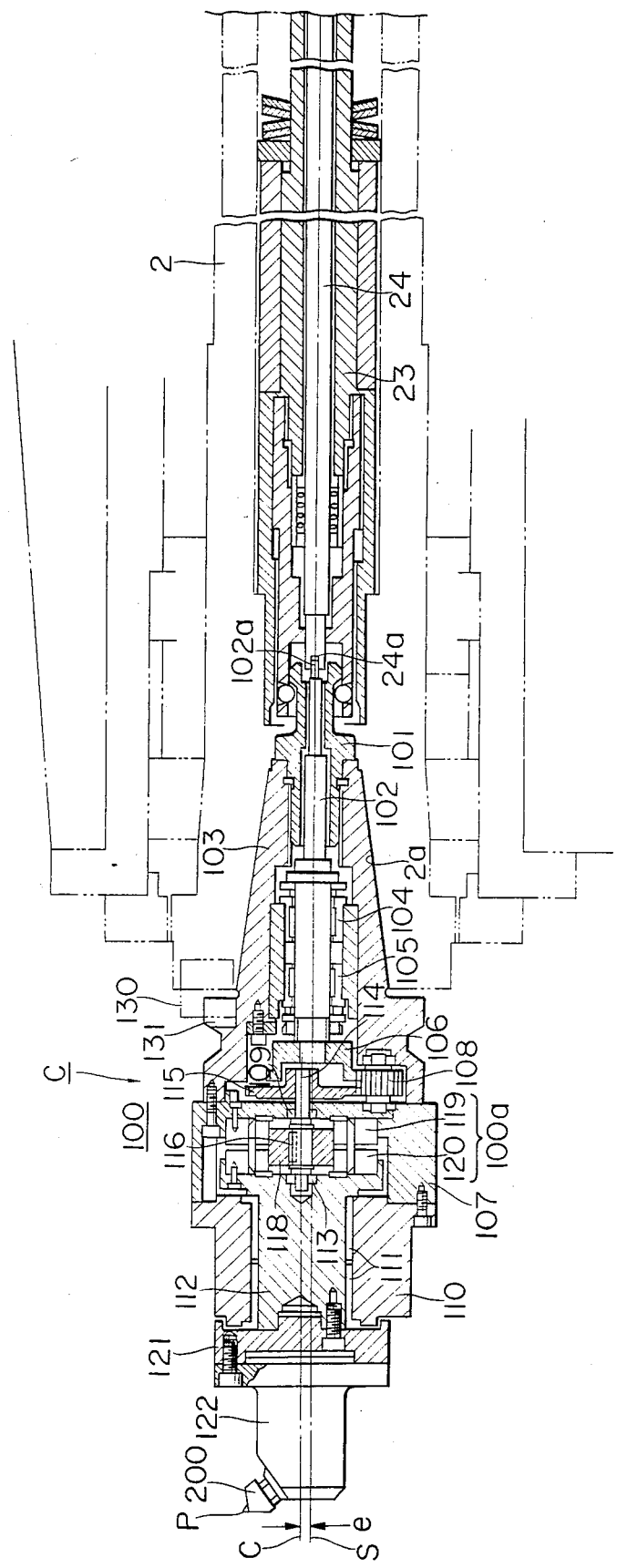
Figure 3:
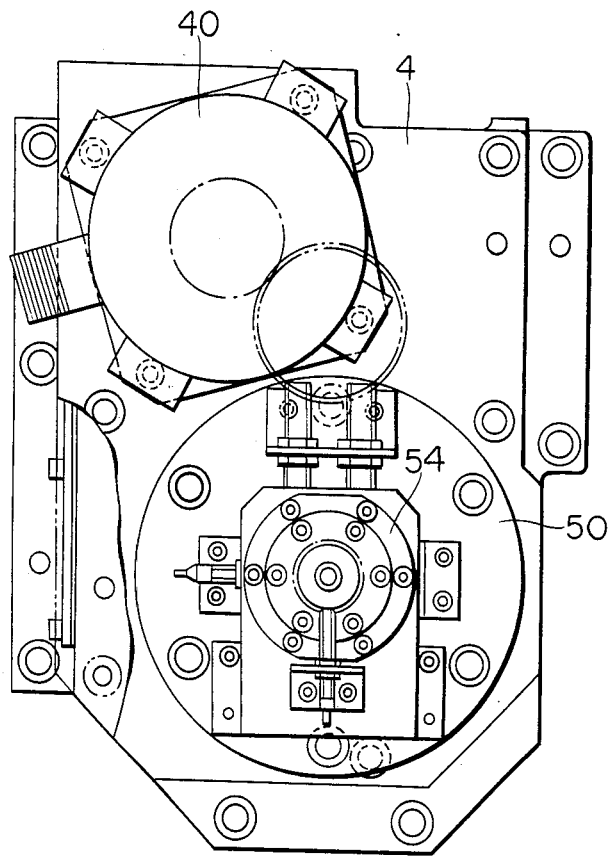

The depth of cut controlling shaft 24 is adapted to be advanced towards the forward end of the main spindle 2 by the piston 54a of a cylinder 54 to drive the depth of cut controlling shaft 24 axially for fastening and releasing a connecting shaft 102, and, when piston 54a is advanced forward, slot 24a formed at the forward end portion of the depth of cut controlling shaft 24 is caused to be engaged with the engaging portion 102a formed at the rear end portion of connecting shaft 102 for controlling the radial depth of cut of the bit, connecting shaft 102 being mounted in the through hole of a pull-stud 101 of the radial depth of cut controlling tool holder 100 which is possible to be mounted in a tapered hole 2a formed at the forward end of the main spindle 2 (see FIG. 2b). When piston 54a of drive cylinder 54 for depth of cut controlling shaft 24 is moved rearward, the depth of cut controlling shaft 24 and connecting rod 102 become disconnected. Cylinder 54 is appropriately secured to the body 1 of the headstock A.

In this case, similar to usual practice, the forward and rearward stroke ends of the piston 54a of the drive cylinder 54 for the depth of cut controlling shaft 24 are detected by proximity switches 55 and 56, respectively, provided at the rear part of cylinder 54 so that its positions to clamp and unclamp connecting shaft 102 are detected and confirmed.

The depth of cut controlling shaft 24 can, at the time of the clamping of connecting shaft 102, be positioned at a predetermined angular position by the servo-motor 40, and the phase of the slot 24a for clamping connecting shaft 102 is adjusted so that it corresponds to the phase of the engaging projection 102a of the connecting shaft 102 which is positioned so that the radial depth of cut controlling tool holder 100 is engaged with the main spindle 2. In this case, the angular position of the depth of cut controlling shaft 24 is detected by a proximity switch 57 for detecting the rotary angular position. Clamping and unclamping of the radial depth of cut controlling tool holder 100 are carried out by clamping and unclamping pull-stud 101 of the radial depth of cut controlling tool holder 100 by a well-known bit fastening mechanism as follows. Upon advancing piston 51 of cylinder 50 for a bit clamping a bit the draw-bar 23 is moved towards the forward end of the main spindle 2 through gear 22 and nut-piece 26, whereby the radial depth of cut controlling tool holder 100 is unfastened and urged forward, while, upon retraction of piston 51 towards the forward end of the main spindle 2, gear 22 and nut-piece 26 are freed, whereby draw-bar 23 is drawn towards the rear end of main spindle 2 by the action of belleville springs 58, causing the radial depth of cut controlling tool holder 100 to be clamped to the main spindle 2.

(III) Radial Depth of Cut Controlling Mechanism (FIG. 2b)

The radial depth of cut controlling tool holder 100, which is adapted to be automatically mounted to or dismounted from the forward end of the main spindle 2 by a well-known automatic tool changing device (not shown) has a connecting rod 102 which is coaxial with the rotating center line S of the main spindle 2 and passes through the bore of pull-stud 101, and is rotatably supported within the bore of a tapered shank 103 by bearings 104 and 105. A gear 106 is fixedly secured to shaft 102 and meshes with a gear 108 which is rotatably supported by tapered shank 103 and the body 107 of tool holder 100. Gear 108 meshed with a gear 115 which is secured to an eccentric depth of cut feed shaft 114. Shaft 114 is arranged in parallel with rotating center S of main spindle 2 and has its one end rotatably supported by the body 107 of the tool holder 100 by a bearing 109 and has its other end supported by a bearing 113 mounted in a tool holding shaft 112 which is rotatably supported by bearings 111 in the eccentric bore of an eccentric casing 110 which is fixedly secured to the forward end of the body 107 of tool holder 100 so as to form a part thereof. The eccentric depth of cut feed shaft 114 is connected to the input shaft 118 of a reduction gear unit 100a by a key 116. Reduction gear unit 100a has an output portion 120 which is fastened to tool holding shaft 112, output portion 120 being given, through a stationary part 119 fastened to tapered shank part 103, a relative rotational speed difference between the rotating speed of main shaft 2 and the rotating speed of the eccentric depth of cut feed shaft 114 with the speed difference being reduced to a defined reduction ratio of the reduction gear unit 100a. This differential rotation is transmitted to the tool holding shaft 112 to which the output part 120 of the reduction gear unit 100a is connected, and further transmitted to a boring bar 122 through an eccentric bracket 121. Since the rotating center C of the boring bar 122 is deviated from the rotating center line S of the main spindle 2 by an eccentricity e, the tip position P of the cutting tool 200 (the boring tool) to be mounted on the boring bar 122 is rotated around the eccentrically positioned tool holding shaft 112, whereby the radial distance relative to the center line S of main spindle 2, i.e. the boring center, is varied. As a result, the control of the radial dimensions of tne bored hole is made possible by the rotational control of servo-motor 40.

Figure 5:
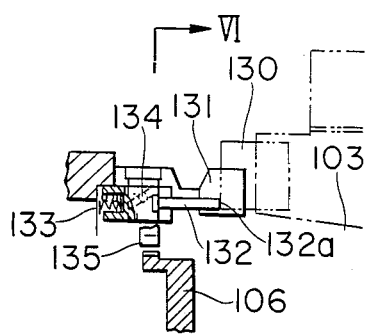
FIG. 5 is a shematic partial sectional view illustrating the lock mechanism for the tool holder of the embodiment shown in FIGS. 2a and 2b.
Figure 6:
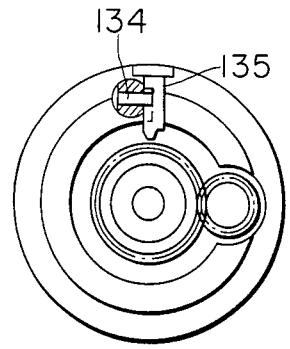
FIG. 6 is a sectional view taken along the line VI—VI of FIG. 5.

At the time of clamping or unclamping of the radial depth of cut controlling tool holder 100 to or from the main spindle 2, an engaging driving key 130 provided at the forward end of main spindle 2 which has been previously indexed at a predetermined angular position by the detections of rotational angular position detectors 301 and 302 to be described later (see FIG. 2a) is made to automatically engage with a key groove 131 formed at the grip portion of tapered shank 103 of tool holder 100 at the time of automatic tool interchange (see FIGS. 5 and 6). At this time, by abutting the tip portion 132a of a slide pin 132 for locking the connecting shaft 102 against the forward end surface of the key 130 of the main spindle 2, the slide pin 132 is caused to be shifted against the action of a spring 133, resulting in sliding of a pin 134 connected to the forward end of pin 132 to cooperate with a grooved cam formed in a lock pin 135. This causes lock pin 135, which is formed with the grooved cam and has been projected into the tooth space of gear 106 at a predetermined position, to be slid radially outwards, releasing connecting shaft 102 from a lock condition in which radial direction depth of cut controlling tool holder 100 is released from main spindle 2 to a freely rotatable condition of connecting shaft 102. (See FIG. 2b) At the time of the release of the tool holder 100 from the main spindle 2, the tool holder 100 is spaced apart from the forward end of the main spindle 2, freeing the slide pin 132, and pin 134 for the grooved cam is forced outwards by the action of the spring 133 so that the lock pin 135 projects into a tooth space of gear 106 at a predetermined position, resulting in a locked condition.

The following is the operation and condition of the radial depth of cut controlling tool holder 100 at the time of its clamping.

1. When a command for interchanging a bit is issued, main spindle 2 is indexed at a definite position by the detecting signal from detectors 301 and 302, i.e. engaging driving key 130 is positioned at a definite position.

2. Depth of cut controlling shaft 24 is positioned at the fundamental angular position, $\theta=0$, by the operation of the servo-motor 40. (This position corresponds to the fundamental angular position of the tool holder 100 where the slot 24a of the depth of cut controlling shaft 24 is positioned at a predetermined angular position).

3. The depth of cut controlling shaft 24 is at an unclamping position due to the action of cylinder 54. That is, piston 54a is retracted to the rightmost position as viewed in FIG. 2a.

4. Draw-bar 23 is in an unclamped state. (Piston 51 of cylinder 50 for bit clamp is at the leftmost advanced position as viewed in FIG. 2a.)

5. The radial depth of cut controlling tool holder 100 is locked at the fundamental angular position ($\theta=0$) of connecting shaft 102 by the engagement of the projected lock pin 135 with a tooth space of gear 106.

Under the conditions Nos. 1 to 5 described above, the tool holder 100 is automatically positioned by an automatic tool interchange device (not shown) in a position such that the groove 131 of the tool holder 100 can receive the engaging driving key 130 of the main spindle 2, and such that the tool holder 100 is clamped to the main spindle 2. Then, draw-bar 23 becomes clamped by the retraction of piston 51 to the rightmost position as viewed in FIG. 2a as well as by the elasticity of the belleville springs 58, the bit being fastened, and the depth of cut controlling shaft 24 comes to be in a state of engagement by the leftwards advancement of piston 54a of cylinder 54 as viewed in FIG. 2a, resulting in engagement of the engaging projection and engaging slot 102a and 24a, respectively, and the depth of cut controlling shaft 24 and connecting shaft 102 are connected together. On the other hand, the slide pin 132 of the connecting shaft 102 is urged towards the forward end of main spindle 2 and the connecting shaft 102 becomes unlocked from the tool holder 100.

Further, the control and feed in the radial direction are carried out as follows.

The position of the depth of cut controlling shaft 24 at the time of clamping of the tool holder 100 to the forward end tapered opening 2a of the main spindle 2 determines the fundamental position of the depth of cut in the radial direction of the tip of the bit or of the cutting tool 200.

The release of the tool holder can be carried out substantially by reversing the above procedures Nos. 1 to 5, and the released tool holder 100 is kept in a magazine by the automatic tool interchanging device with the eccentrically set tool holding shaft 112 being locked at the fundamental angular position ($\theta=0$).

The orientation of the main spindle 2 takes place using a magnetizing member as one of the rotational angular position detectors which is mounted at an appropriate position on the outer periphery of the main spindle 2 near its rear end portion, and a magnetic sensor 301 as the other of the rotational angular position detectors reacts to the magnetic field and directly detects a predetermined angular position at which the main spindle 2 is to be stopped so that the main electrical motor is electrically stopped in its operation. The magnetic sensor 301 is fixedly secured to the body 4 of the depth of cut controlling gear box B.

Since the method in accordance with the present invention can be carried out as described above and the apparatus in accordance with the present invention has a constitution and operation as stated above, it will be appreciated that the present invention provides the following advantages:

1. Since the eccentric mechanism is provided in the cutting tool portion, the main spindle can have an ordinary constitution, making the machining easy and not deteriorating the rigidity compared with a conventional apparatus in which the eccentric mechanism in contained within the main spindle;

2. Since the reduction mechanism is installed within the tool holder and the reduction ratio is big, the effects of backlash, etc. of the differential gear mechanism are not large enough to damage the rigidity of the tip of the bit.

3. Since the differential gear mechanism uses spur gears, it allows a higher rate of revolution, decreasing backlash and increasing the rigidity compared with a conventional differential gear mechanism wherein level gears are used.

4. A larger amount of eccentricity can be realized. (This has a close relationship with effect No. 1 stated above, and as one example, an eccentricity of 5 mm, and a diameter of 20 mm can be given).

5. Since a reduction mechanism having a larger reduction ratio (e.g. 120:1) is provided at the side of the tool holder, and the control system (servo-motor, differential gear mechanism, controlling shaft, etc.) necessitates little power, the mechanism can be made simple, reducing manufacturing costs.

It is to be understood that although a single embodiment of the present invention has been illustrated and described above, it is not to be limited thereto except insofar as such limitation are included in the following claims.

What is claimed is:

1. A method for controlling a radial depth of cut of a rotary cutting tool in a numerically controlled machine tool which is provided with a main spindle adapted to be rotated with a tool holder being interchangeably clamped to the forward end thereof and which carries out the machining by a relative movement between said rotary cutting tool and a workpiece, comprising constituting said tool holder so that it is possible to control the radial depth of cut of the tip of said cutting tool held by it through an eccentric mechanism which is adapted to be locked at a fundamental angular position in said tool holder at the time of its release from said main spindle, fitting said tool holder to the forward end of said main spindle which is previously stopped at a predetermined angular position, simultaneously causing the lock of said eccentric mechanism of said tool holder to be released, fastening said tool holder to said main spindle by a clamping mechanism which is passed through the bore formed in said main spindle, making said tool holder able to be rotated in synchronization with said main spindle through a differential mechanism which is adapted to be revolved by a servo-motor, providing a depth of cut controlling shaft through the bore of said clamping shaft so as to be rotatable therein and axially movable therethrough and so as to be engageable with said eccentric mechanism of said tool holder when axially moved forward at the time when said tool holder is at said fundamental angular position, and controlling the position of said tip of said cutting tool, when required, by manipulating said eccentric mechanism through said depth of cut controlling shaft and said differential mechanism by said servo-motor, whereby said control of said eccentric mechanism from said fundamental angular position can be carried out regardless of whether said main spindle is stopped or in motion.

2. An apparatus for controlling a radial depth of cut of a rotary cutting tool in a numerically controlled machine tool which is provided with a main spindle adapted to be rotated with a tool holder being interchangeably mounted to the forward end thereof and which carries out the machining by a relative movement between said rotary cutting tool and a workpiece, comprising a tool holder having an eccentric mechanism comprising a tool holding shaft rotatably and eccentrically supported in the body of said tool holder and adapted to hold said rotary cutting tool at the forward end thereof, a connecting shaft concentrically rotatably supported in the body of said tool holder and formed at the rear end with an engaging part, and a reduction gear mechanism connecting said tool holding shaft and said connecting shaft, and a lock mechanism shifting arranged in said body of said tool holder and adapted to be engageable and disengageable with said eccentric mechanism;

a fastening mechanism for said tool holder having a hollow draw-bar which is arranged within the bore of said main spindle and adapted to hold said tool holder at its rear end part so as to urge it rearwards to fasten it at the time of fitting and to urge it forwards to release said tool holder at the time of the interchange of said cutting tool;

a rotary controlling mechanism comprising a depth of cut control shaft which is rotatably and axially shiftably supported within the bore of said draw-bar of said fastening mechanism and formed at the forward end with an engaging part so as to be engageable with said engaging part of said connecting shaft of said tool holder, a gear drive mechanism so as to rotate said depth of cut control shaft in synchronization with said main shaft, a differential gear mechanism disposed intermediate said gear drive mechanism, a servo-motor so as to give a desired rotation to said depth of cut control shaft through said differential gear mechanism with a desired rotation being superimposed, and a position detecting mechanism which is so constructed that prior to the interchange of said cutting tool said main spindle and said depth of cut control shaft are stopped at a predetermined fundamental angular position; and a connecting mechanism having a driving means to axially advance or retract said depth of cut control shaft in order to connect and disconnect said depth of cut control shaft and said connecting shaft of said tool holder, and a position detecting means to ascertain the advanced and retracted positions of said depth of cut control shaft, whereby the radial tip position of said cutting tool held by said tool holder can be controlled regardless of whether said main spindle is stopped or in motion.

3. An apparatus for controlling a radial direction depth of cut of a rotary cutting tool in a numerically controlled machine tool as claimed in claim 2, wherein said tool holder to be interchangeably fit to the forward end of said main spindle comprises a shank provided with a projected pull-stud to be fit into the opening formed at the forward end of said main spindle, a connecting shaft rotatably supported within said shank coaxially thereto and formed near the rear end of the bore of said pull-stud with an engaging part, a body of said tool holder integrally formed with the forward end part of said shank, a tool holding shaft which is rotatably supported within said body of said tool holder in parallel with said connecting shaft and eccentrically thereto and adapted to releasably and protrudely mount a boring tool at the forward end, a reduction gear mechanism to connect said tool holding shaft and said connecting shaft, and a lock mechanism which is provided with a pin shiftably arranged near the forward end portion of said shank and adapted to release the engagement with said reduction gear by the shift due to its abutment with the forward end of said main spindle, and said boring tool locked at the fundamental angular position of said tool holder has its radial direction tip position be possible to be controlled by a rotary angle numerical control through a connecting shaft which is adapted to have the locking released under the utilization of the fastening or releasing operation for the interchange of said cutting tool and engageable with a connecting shaft which is adapted to be engageable by said depth of cut control shaft through engaging parts within the bore of said main shaft.

* * * * *